United States Patent
Anderson et al.

(10) Patent No.: US 12,307,251 B2
(45) Date of Patent: *May 20, 2025

(54) VECTOR REVERSE

(71) Applicant: TEXAS INSTRUMENTS INCORPORATED, Dallas, TX (US)

(72) Inventors: Timothy D. Anderson, University Park, TX (US); Duc Bui, Grand Prairie, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/404,238

(22) Filed: Jan. 4, 2024

(65) Prior Publication Data
US 2024/0201991 A1  Jun. 20, 2024

Related U.S. Application Data

(63) Continuation of application No. 17/705,453, filed on Mar. 28, 2022, now Pat. No. 11,900,112, which is a continuation of application No. 16/422,795, filed on May 24, 2019, now Pat. No. 11,288,067.

(51) Int. Cl.
*G06F 9/30* (2018.01)

(52) U.S. Cl.
CPC ...... *G06F 9/30036* (2013.01); *G06F 9/30038* (2023.08); *G06F 9/30043* (2013.01); *G06F 9/30105* (2013.01); *G06F 9/3013* (2013.01)

(58) Field of Classification Search
CPC ............. G06F 9/30036; G06F 9/30043; G06F 9/30105; G06F 9/3013; G06F 9/30032; G06F 9/30038
See application file for complete search history.

(56) References Cited

U.S. PATENT DOCUMENTS

| | | | |
|---|---|---|---|
| 6,226,722 B1 | 5/2001 | Shippy et al. | |
| 7,822,955 B2 * | 10/2010 | Flynn | G06F 9/30032 712/300 |
| 2004/0154006 A1 | 8/2004 | Heishi et al. | |
| 2011/0302394 A1 | 12/2011 | Russell et al. | |
| 2014/0013083 A1 | 1/2014 | Jha | |
| 2016/0048445 A1 * | 2/2016 | Gschwind | G06F 7/76 717/130 |
| 2016/0179522 A1 | 6/2016 | Corbal et al. | |

(Continued)

*Primary Examiner* — Farley Abad
(74) *Attorney, Agent, or Firm* — Michael T. Gabrik; Frank D. Cimino

(57) ABSTRACT

Processors and methods reverse source data in response to a vector reverse instruction. In an implementation, a processor comprises an instruction fetch unit; and a datapath that includes a register file that includes a source register and a destination register; and a set of functional units. The instruction fetch unit receives a vector reverse instruction that specifies a single vector reverse operation to be executed in a single operation. The vector reverse instruction also specifies a first functional unit from among a set of functional units, and based on the vector reverse instruction, the first functional unit receives the first vector from a source register; reverses an order of a set of elements of a first vector stored in the source register to produce a second vector; and causes the second vector to be stored in a destination register.

20 Claims, 8 Drawing Sheets

(56) References Cited

U.S. PATENT DOCUMENTS

| | | | |
|---|---|---|---|
| 2016/0179529 A1* | 6/2016 | Corbal | G06F 9/30018 |
| | | | 712/4 |
| 2017/0115989 A1* | 4/2017 | Anderson | G06F 9/3853 |
| 2020/0264877 A1 | 8/2020 | Lichtenau et al. | |

\* cited by examiner

| 31 | 26 | 25 | 20 | 19 | 14 | 13 | 8 | 7 | 6 | 5 | 4 | 1 | 0 |
|---|---|---|---|---|---|---|---|---|---|---|---|---|---|
| DST | | 000110 | | SRC1 | | 000000 | | 00 | | 0 | 0111 | | P |

FIG. 14a

| 31 | 26 | 25 | 20 | 19 | 14 | 13 | 8 | 7 | 6 | 5 | 4 | 1 | 0 |
|---|---|---|---|---|---|---|---|---|---|---|---|---|---|
| DST | | 000110 | | SRC1 | | 000000 | | 01 | | 0 | 0111 | | P |

FIG. 14b

| 31 | 26 | 25 | 20 | 19 | 14 | 13 | 8 | 7 | 6 | 5 | 4 | 1 | 0 |
|---|---|---|---|---|---|---|---|---|---|---|---|---|---|
| DST | | 000110 | | SRC1 | | 000000 | | 10 | | 0 | 0111 | | P |

FIG. 14c

| 31 | 26 | 25 | 20 | 19 | 14 | 13 | 8 | 7 | 6 | 5 | 4 | 1 | 0 |
|---|---|---|---|---|---|---|---|---|---|---|---|---|---|
| DST | | 000110 | | SRC1 | | 000000 | | 11 | | 0 | 0111 | | P |

FIG. 14d

VECTOR REVERSE

CROSS-REFERENCE TO RELATED APPLICATIONS

This application is a continuation of U.S. patent application Ser. No. 17/705,453, filed Mar. 28, 2022, which is a continuation of U.S. patent application Ser. No. 16/422,795, filed May 24, 2019, now U.S. Pat. No. 11,288,067, each of which is incorporated by reference herein in its entirety.

BACKGROUND

Modern digital signal processors (DSP) face multiple challenges. DSPs may frequently execute software that requires performance of common algorithms that require reversing the order of data elements for additional computation (e.g., operations to be performed on the data elements), such as autocorrelation. Reversing data elements in order to perform additional operations on the data elements may require multiple cycles to complete. Considering that DSPs may be frequently to perform algorithms that require such reversal of data elements, such computational overhead in the form of multiple cycles required to perform each reversal of data elements is not desirable.

SUMMARY

In accordance with at least one example of the disclosure, a processor comprises an instruction fetch unit, and a datapath. The instruction fetch unit is configured to receive a vector reverse instruction that specifies a single vector reverse operation. The datapath, which is coupled to the instruction fetch unit, includes a register file that includes a source register configured to store a first vector that includes a set of elements and a destination register; and a set of functional units coupled to the register file that includes a first functional unit. The vector reverse instruction, which is executed in a single operation, specifies the first functional unit from among the set of functional units, and based on the vector reverse instruction, the first functional unit is configured to receive the first vector from the source register; reverse an order of the set of elements of the first vector to produce a second vector; and cause the second vector to be stored in the destination register.

In accordance with another example of the disclosure, a method comprises receiving a vector reverse instruction that specifies a source register from among a register file, a destination register from among the register file, and a functional unit from among a set of functional units. The vector reverse instruction further specifies that the vector reverse instruction is single vector reverse operation that is completed in a single operation. The method further comprises, based on the vector reverse instruction, performing, by the specified functional unit receiving a first vector from the source register, wherein the first vector includes a set of elements; reversing the set of elements of the first vector to produce a second vector; and storing the second vector in the destination register.

BRIEF DESCRIPTION OF THE DRAWINGS

For a detailed description of various examples, reference will now be made to the accompanying drawings in which:

FIGS. 14a-14d show examples of instruction coding of instructions in accordance with various examples.

DETAILED DESCRIPTION

Figure 1:
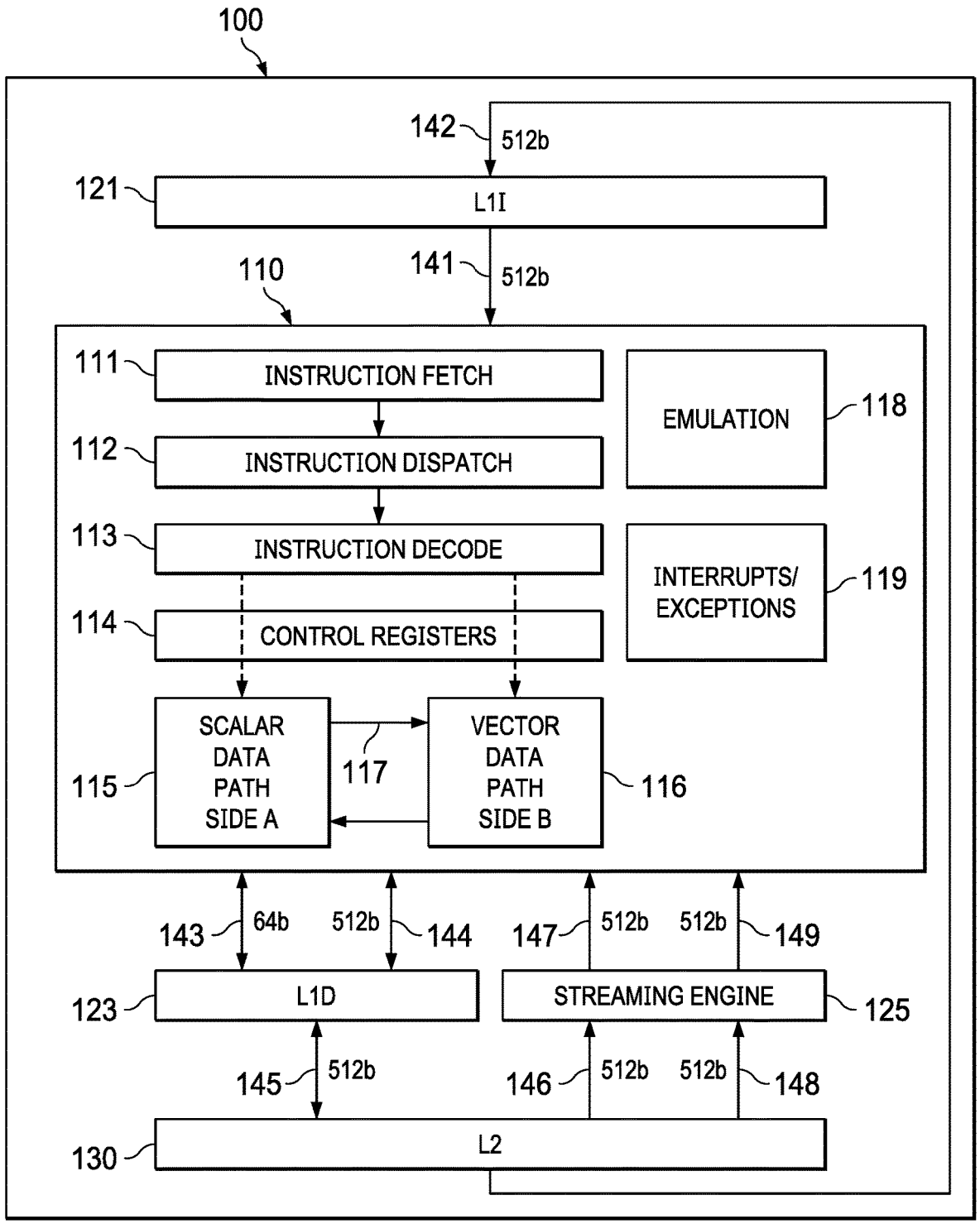
FIG. 1 shows a dual scalar/vector datapath processor in accordance with various examples.

As explained above, DSPs often execute software that requires performance of common algorithms that require reversing the order of data elements for additional computation (e.g., operations to be performed on the data elements), such as autocorrelation. Reversing data elements in order to perform additional operations on the data elements may require multiple cycles to complete. Considering that DSPs may be frequently to perform algorithms that require such reversal of data elements, such computational overhead in the form of multiple cycles required to perform each reversal of data elements is not desirable.

In order to improve performance of a DSP that performs algorithms requiring reversal of data elements, at least by reducing the computational overhead of such operations, examples of the present disclosure are directed to a vector reverse instruction that reverses the order of data elements in a source register and stores the reversed data elements in a destination register.

In an example, the source data is a 512-bit vector stored in a vector source register. The source register has a plurality of lanes, each of which contains a data element. In one example, each lane is a byte (e.g., 8 bits) and thus the source register includes 64 such lanes, each containing an 8-bit data element. In another example, each lane is a half word (e.g., 16 bits) and thus the source register includes 32 such lanes, each containing a 16-bit data element. In yet another example, each lane is a word (e.g., 32 bits) and thus the source register includes 16 such lanes, each containing a 32-bit data element. In still another example, each lane is a double word (e.g., 64 bits) and thus the source register includes 8 such lanes, each containing a 64-bit data element.

Regardless of the size of the data elements (e.g., lanes into which the source data is divided), executing the vector reverse instruction creates reversed source data based on the source data by reversing the order of the data elements. The reversed source data is then stored in the destination register. For example, in the case where each lane of source data, being a 512-bit vector, is a double word (e.g., 64 bits), the 64-bit data elements are initially arranged in an order given by: 0, 1, 2, 3, 4, 5, 6, 7. Executing the vector reverse instruction creates reversed source data comprising the same 64-bit data elements, but that are arranged in an order given by: 7, 6, 5, 4, 3, 2, 1, 0. While the data elements are reversed, each data element itself remains in-order (not reversed). Continuing the previous example, a 64-bit data element having bytes arranged in an order given by: 0, 1, 2, 3, 4, 5, 6, 7 would have bytes arranged in the same order following reversal of the source data. The foregoing examples apply similarly to cases in which each lane is a word (e.g., 32 bits), a half word (e.g., 16 bits), or a byte (e.g., 8 bits). The scope of the present disclosure is not intended to be limited to any particular lane size.

By implementing a single vector reverse instruction, reversed data elements are stored in a destination register with reduced computational (and instructional) overhead. Since DSPs may algorithms that require reversing the order of data elements frequently, reductions in computational and instruction overhead required to reverse data elements improves performance of the DSP.

FIG. 1 illustrates a dual scalar/vector datapath processor in accordance with various examples of this disclosure. Processor 100 includes separate level one instruction cache (L1I) 121 and level one data cache (L1D) 123. Processor 100 includes a level two combined instruction/data cache (L2) 130 that holds both instructions and data. FIG. 1 illustrates connection between level one instruction cache 121 and level two combined instruction/data cache 130 (bus 142). FIG. 1 illustrates connection between level one data cache 123 and level two combined instruction/data cache 130 (bus 145). In an example, processor 100 level two combined instruction/data cache 130 stores both instructions to back up level one instruction cache 121 and data to back up level one data cache 123. In this example, level two combined instruction/data cache 130 is further connected to higher level cache and/or main memory in a manner known in the art and not illustrated in FIG. 1. In this example, central processing unit core 110, level one instruction cache 121, level one data cache 123 and level two combined instruction/data cache 130 are formed on a single integrated circuit. This signal integrated circuit optionally includes other circuits.

Central processing unit core 110 fetches instructions from level one instruction cache 121 as controlled by instruction fetch unit 111. Instruction fetch unit 111 determines the next instructions to be executed and recalls a fetch packet sized set of such instructions. The nature and size of fetch packets are further detailed below. As known in the art, instructions are directly fetched from level one instruction cache 121 upon a cache hit (if these instructions are stored in level one instruction cache 121). Upon a cache miss (the specified instruction fetch packet is not stored in level one instruction cache 121), these instructions are sought in level two combined cache 130. In this example, the size of a cache line in level one instruction cache 121 equals the size of a fetch packet. The memory locations of these instructions are either a hit in level two combined cache 130 or a miss. A hit is serviced from level two combined cache 130. A miss is serviced from a higher level of cache (not illustrated) or from main memory (not illustrated). As is known in the art, the requested instruction may be simultaneously supplied to both level one instruction cache 121 and central processing unit core 110 to speed use.

In an example, central processing unit core 110 includes plural functional units to perform instruction specified data processing tasks. Instruction dispatch unit 112 determines the target functional unit of each fetched instruction. In this example, central processing unit 110 operates as a very long instruction word (VLIW) processor capable of operating on plural instructions in corresponding functional units simultaneously. Preferably a complier organizes instructions in execute packets that are executed together. Instruction dispatch unit 112 directs each instruction to its target functional unit. The functional unit assigned to an instruction is completely specified by the instruction produced by a compiler. The hardware of central processing unit core 110 has no part in this functional unit assignment. In this example, instruction dispatch unit 112 may operate on plural instructions in parallel. The number of such parallel instructions is set by the size of the execute packet. This will be further detailed below.

One part of the dispatch task of instruction dispatch unit 112 is determining whether the instruction is to execute on a functional unit in scalar datapath side A 115 or vector datapath side B 116. An instruction bit within each instruction called the s bit determines which datapath the instruction controls. This will be further detailed below.

Instruction decode unit 113 decodes each instruction in a current execute packet. Decoding includes identification of the functional unit performing the instruction, identification of registers used to supply data for the corresponding data processing operation from among possible register files and identification of the register destination of the results of the corresponding data processing operation. As further explained below, instructions may include a constant field in place of one register number operand field. The result of this decoding is signals for control of the target functional unit to perform the data processing operation specified by the corresponding instruction on the specified data.

Central processing unit core 110 includes control registers 114. Control registers 114 store information for control of the functional units in scalar datapath side A 115 and vector datapath side B 116. This information could be mode information or the like.

The decoded instructions from instruction decode 113 and information stored in control registers 114 are supplied to scalar datapath side A 115 and vector datapath side B 116. As a result functional units within scalar datapath side A 115 and vector datapath side B 116 perform instruction specified data processing operations upon instruction specified data and store the results in an instruction specified data register or registers. Each of scalar datapath side A 115 and vector datapath side B 116 includes plural functional units that preferably operate in parallel. These will be further detailed below in conjunction with FIG. 2. There is a datapath 117 between scalar datapath side A 115 and vector datapath side B 116 permitting data exchange.

Central processing unit core 110 includes further non-instruction based modules. Emulation unit 118 permits determination of the machine state of central processing unit core 110 in response to instructions. This capability will typically be employed for algorithmic development. Interrupts/exceptions unit 119 enables central processing unit core 110 to be responsive to external, asynchronous events (interrupts) and to respond to attempts to perform improper operations (exceptions).

Central processing unit core 110 includes streaming engine 125. Streaming engine 125 of this illustrated embodiment supplies two data streams from predetermined addresses typically cached in level two combined cache 130 to register files of vector datapath side B 116. This provides controlled data movement from memory (as cached in level two combined cache 130) directly to functional unit operand inputs. This is further detailed below.

FIG. 1 illustrates exemplary data widths of busses between various parts. Level one instruction cache 121 supplies instructions to instruction fetch unit 111 via bus 141. Bus 141 is preferably a 512-bit bus. Bus 141 is unidirectional from level one instruction cache 121 to central processing unit 110. Level two combined cache 130 supplies instructions to level one instruction cache 121 via bus 142. Bus 142 is preferably a 512-bit bus. Bus 142 is unidirectional from level two combined cache 130 to level one instruction cache 121.

Level one data cache 123 exchanges data with register files in scalar datapath side A 115 via bus 143. Bus 143 is preferably a 64-bit bus. Level one data cache 123 exchanges data with register files in vector datapath side B 116 via bus 144. Bus 144 is preferably a 512-bit bus. Busses 143 and 144 are illustrated as bidirectional supporting both central processing unit 110 data reads and data writes. Level one data cache 123 exchanges data with level two combined cache 130 via bus 145. Bus 145 is preferably a 512-bit bus. Bus 145 is illustrated as bidirectional supporting cache service for both central processing unit 110 data reads and data writes.

As known in the art, CPU data requests are directly fetched from level one data cache 123 upon a cache hit (if the requested data is stored in level one data cache 123). Upon a cache miss (the specified data is not stored in level one data cache 123), this data is sought in level two combined cache 130. The memory locations of this requested data is either a hit in level two combined cache 130 or a miss. A hit is serviced from level two combined cache 130. A miss is serviced from another level of cache (not illustrated) or from main memory (not illustrated). As is known in the art, the requested instruction may be simultaneously supplied to both level one data cache 123 and central processing unit core 110 to speed use.

Level two combined cache 130 supplies data of a first data stream to streaming engine 125 via bus 146. Bus 146 is preferably a 512-bit bus. Streaming engine 125 supplies data of this first data stream to functional units of vector datapath side B 116 via bus 147. Bus 147 is preferably a 512-bit bus. Level two combined cache 130 supplies data of a second data stream to streaming engine 125 via bus 148. Bus 148 is preferably a 512-bit bus. Streaming engine 125 supplies data of this second data stream to functional units of vector datapath side B 116 via bus 149. Bus 149 is preferably a 512-bit bus. Busses 146, 147, 148 and 149 are illustrated as unidirectional from level two combined cache 130 to streaming engine 125 and to vector datapath side B 116 in accordance with various examples of this disclosure.

Streaming engine 125 data requests are directly fetched from level two combined cache 130 upon a cache hit (if the requested data is stored in level two combined cache 130). Upon a cache miss (the specified data is not stored in level two combined cache 130), this data is sought from another level of cache (not illustrated) or from main memory (not illustrated). It is technically feasible in some examples for level one data cache 123 to cache data not stored in level two combined cache 130. If such operation is supported, then upon a streaming engine 125 data request that is a miss in level two combined cache 130, level two combined cache 130 should snoop level one data cache 123 for the stream engine 125 requested data. If level one data cache 123 stores this data its snoop response would include the data, which is then supplied to service the streaming engine 125 request. If level one data cache 123 does not store this data its snoop response would indicate this and level two combined cache 130 must service this streaming engine 125 request from another level of cache (not illustrated) or from main memory (not illustrated).

In an example, both level one data cache 123 and level two combined cache 130 may be configured as selected amounts of cache or directly addressable memory in accordance with U.S. Pat. No. 6,606,686 entitled UNIFIED MEMORY SYSTEM ARCHITECTURE INCLUDING CACHE AND DIRECTLY ADDRESSABLE STATIC RANDOM ACCESS MEMORY.

Figure 2:
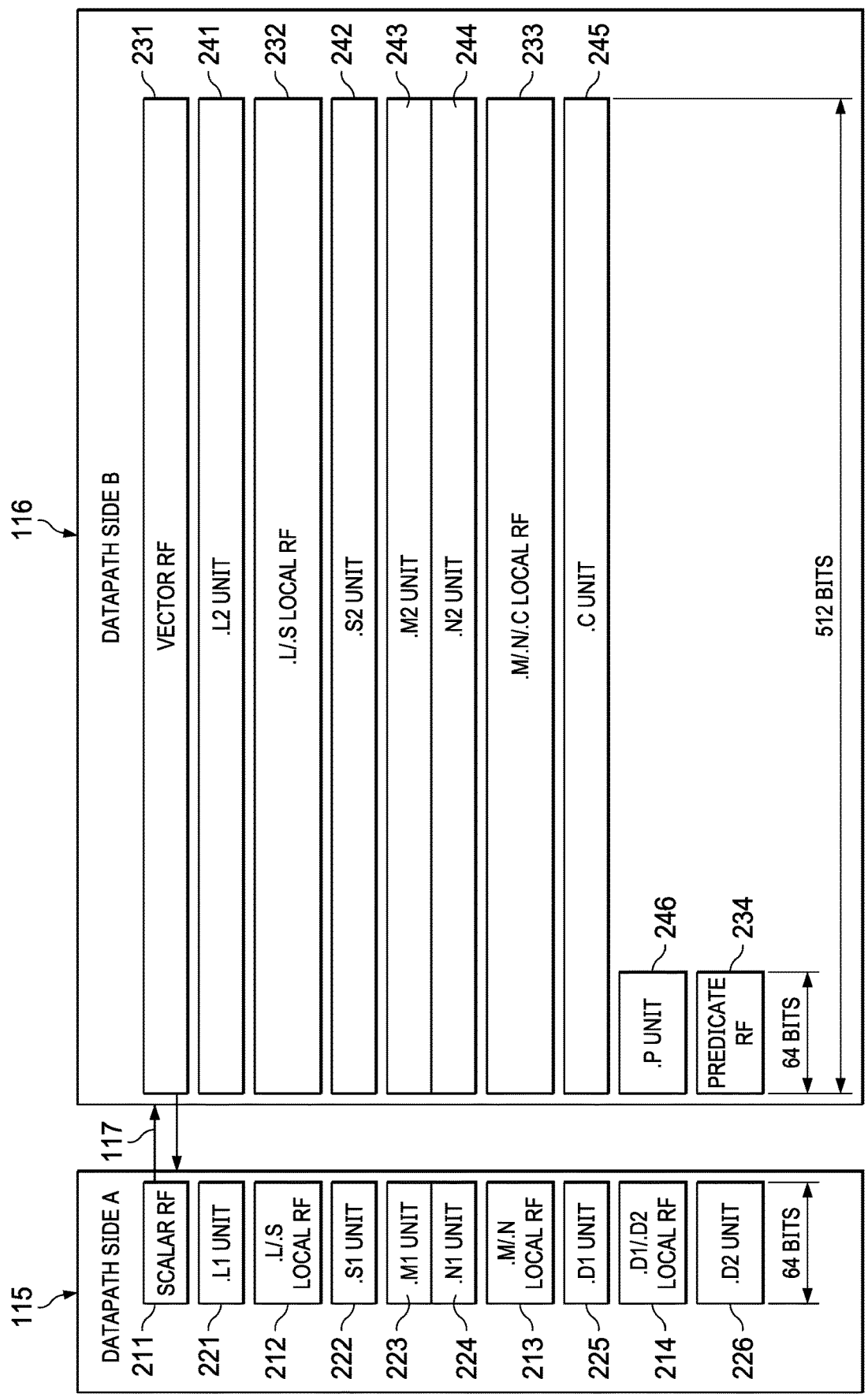
FIG. 2 shows the registers and functional units in the dual scalar/vector datapath processor illustrated in FIG. 1 and in accordance with various examples.

FIG. 2 illustrates further details of functional units and register files within scalar datapath side A 115 and vector datapath side B 116. Scalar datapath side A 115 includes global scalar register file 211, L1/S1 local register file 212, M1/N1 local register file 213 and D1/D2 local register file 214. Scalar datapath side A 115 includes L1 unit 221, S1 unit 222, M1 unit 223, N1 unit 224, D1 unit 225 and D2 unit 226. Vector datapath side B 116 includes global vector register file 231, L2/S2 local register file 232, M2/N2/C local register file 233 and predicate register file 234. Vector datapath side B 116 includes L2 unit 241, S2 unit 242, M2 unit 243, N2 unit 244, C unit 245 and P unit 246. There are limitations upon which functional units may read from or write to which register files. These will be detailed below.

Scalar datapath side A 115 includes L1 unit 221. L1 unit 221 generally accepts two 64-bit operands and produces one 64-bit result. The two operands are each recalled from an instruction specified register in either global scalar register file 211 or L1/S1 local register file 212. L1 unit 221 preferably performs the following instruction selected operations: 64-bit add/subtract operations; 32-bit min/max operations; 8-bit Single Instruction Multiple Data (SIMD) instructions such as sum of absolute value, minimum and maximum determinations; circular min/max operations; and various move operations between register files. The result may be written into an instruction specified register of global scalar register file 211, L1/S1 local register file 212, M1/N1 local register file 213 or D1/D2 local register file 214.

Scalar datapath side A 115 includes S1 unit 222. S1 unit 222 generally accepts two 64-bit operands and produces one 64-bit result. The two operands are each recalled from an instruction specified register in either global scalar register file 211 or L1/S1 local register file 212. S1 unit 222 preferably performs the same type operations as L1 unit 221. There optionally may be slight variations between the data processing operations supported by L1 unit 221 and S1 unit 222. The result may be written into an instruction specified register of global scalar register file 211, L1/S1 local register file 212, M1/N1 local register file 213 or D1/D2 local register file 214.

Scalar datapath side A 115 includes M1 unit 223. M1 unit 223 generally accepts two 64-bit operands and produces one 64-bit result. The two operands are each recalled from an instruction specified register in either global scalar register file 211 or M1/N1 local register file 213. M1 unit 223 preferably performs the following instruction selected operations: 8-bit multiply operations; complex dot product operations; 32-bit bit count operations; complex conjugate multiply operations; and bit-wise Logical Operations, moves, adds and subtracts. The result may be written into an instruction specified register of global scalar register file 211, L1/S1 local register file 212, M1/N1 local register file 213 or D1/D2 local register file 214.

Scalar datapath side A 115 includes N1 unit 224. N1 unit 224 generally accepts two 64-bit operands and produces one 64-bit result. The two operands are each recalled from an instruction specified register in either global scalar register file 211 or M1/N1 local register file 213. N1 unit 224 preferably performs the same type operations as M1 unit 223. There may be certain double operations (called dual issued instructions) that employ both the M1 unit 223 and the N1 unit 224 together. The result may be written into an instruction specified register of global scalar register file 211, L1/S1 local register file 212, M1/N1 local register file 213 or D1/D2 local register file 214.

Scalar datapath side A 115 includes D1 unit 225 and D2 unit 226. D1 unit 225 and D2 unit 226 generally each accept two 64-bit operands and each produce one 64-bit result. D1 unit 225 and D2 unit 226 generally perform address calculations and corresponding load and store operations. D1 unit 225 is used for scalar loads and stores of 64 bits. D2 unit 226 is used for vector loads and stores of 512 bits. D1 unit 225 and D2 unit 226 preferably also perform: swapping, pack and unpack on the load and store data; 64-bit SIMD arithmetic operations; and 64-bit bit-wise logical operations. D1/D2 local register file 214 will generally store base and offset addresses used in address calculations for the corresponding loads and stores. The two operands are each recalled from an instruction specified register in either global scalar register file 211 or D1/D2 local register file 214. The calculated result may be written into an instruction specified register of global scalar register file 211, L1/S1 local register file 212, M1/N1 local register file 213 or D1/D2 local register file 214.

Vector datapath side B 116 includes L2 unit 241. L2 unit 241 generally accepts two 512-bit operands and produces one 512-bit result. The two operands are each recalled from an instruction specified register in either global vector register file 231, L2/S2 local register file 232 or predicate register file 234. L2 unit 241 preferably performs instruction similar to L1 unit 221 except on wider 512-bit data. The result may be written into an instruction specified register of global vector register file 231, L2/S2 local register file 232, M2/N2/C local register file 233 or predicate register file 234.

Vector datapath side B 116 includes S2 unit 242. S2 unit 242 generally accepts two 512-bit operands and produces one 512-bit result. The two operands are each recalled from an instruction specified register in either global vector register file 231, L2/S2 local register file 232 or predicate register file 234. S2 unit 242 preferably performs instructions similar to S1 unit 222. The result may be written into an instruction specified register of global vector register file 231, L2/S2 local register file 232, M2/N2/C local register file 233 or predicate register file 234.

Vector datapath side B 116 includes M2 unit 243. M2 unit 243 generally accepts two 512-bit operands and produces one 512-bit result. The two operands are each recalled from an instruction specified register in either global vector register file 231 or M2/N2/C local register file 233. M2 unit 243 preferably performs instructions similar to M1 unit 223 except on wider 512-bit data. The result may be written into an instruction specified register of global vector register file 231, L2/S2 local register file 232 or M2/N2/C local register file 233.

Vector datapath side B 116 includes N2 unit 244. N2 unit 244 generally accepts two 512-bit operands and produces one 512-bit result. The two operands are each recalled from an instruction specified register in either global vector register file 231 or M2/N2/C local register file 233. N2 unit 244 preferably performs the same type operations as M2 unit 243. There may be certain double operations (called dual issued instructions) that employ both M2 unit 243 and the N2 unit 244 together. The result may be written into an instruction specified register of global vector register file 231, L2/S2 local register file 232 or M2/N2/C local register file 233.

Vector datapath side B 116 includes C unit 245. C unit 245 generally accepts two 512-bit operands and produces one 512-bit result. The two operands are each recalled from an instruction specified register in either global vector register file 231 or M2/N2/C local register file 233. C unit 245 preferably performs: "Rake" and "Search" instructions; up to 512 2-bit PN*8-bit multiplies I/Q complex multiplies per clock cycle; 8-bit and 16-bit Sum-of-Absolute-Difference (SAD) calculations, up to 512 SADs per clock cycle; horizontal add and horizontal min/max instructions; and vector permutes instructions. C unit 245 also contains 4 vector control registers (CUCR0 to CUCR3) used to control certain operations of C unit 245 instructions. Control registers CUCR0 to CUCR3 are used as operands in certain C unit 245 operations. Control registers CUCR0 to CUCR3 are preferably used: in control of a general permutation instruction (VPERM); and as masks for SIMD multiple DOT product operations (DOTPM) and SIMD multiple Sum-of-Absolute-Difference (SAD) operations. Control register CUCR0 is preferably used to store the polynomials for Galois Field Multiply operations (GFMPY). Control register CUCR1 is preferably used to store the Galois field polynomial generator function.

Vector datapath side B 116 includes P unit 246. P unit 246 performs basic logic operations on registers of local predicate register file 234. P unit 246 has direct access to read from and write to predication register file 234. These operations include single register unary operations such as: NEG (negate) which inverts each bit of the single register; BITCNT (bit count) which returns a count of the number of bits in the single register having a predetermined digital state (1 or 0); RMBD (right most bit detect) which returns a number of bit positions from the least significant bit position (right most) to a first bit position having a predetermined digital state (1 or 0); DECIMATE which selects every instruction specified Nth (1, 2, 4, etc.) bit to output; and EXPAND which replicates each bit an instruction specified N times (2, 4, etc.). These operations include two register binary operations such as: AND a bitwise AND of data of the two registers; NAND a bitwise AND and negate of data of the two registers; OR a bitwise OR of data of the two registers; NOR a bitwise OR and negate of data of the two registers; and XOR exclusive OR of data of the two registers. These operations include transfer of data from a predicate register of predicate register file 234 to another specified predicate register or to a specified data register in global vector register file 231. A commonly expected use of P unit 246 includes manipulation of the SIMD vector comparison results for use in control of a further SIMD vector operation. The BITCNT instruction may be used to count the number of 1's in a predicate register to determine the number of valid data elements from a predicate register.

Figure 3:
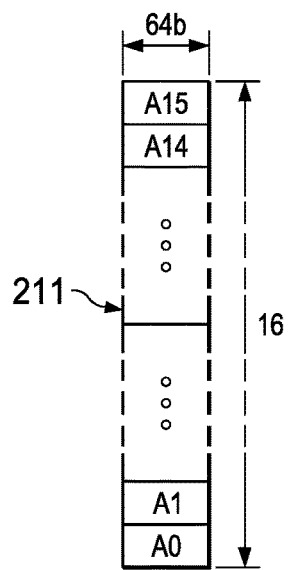
FIG. 3 shows an exemplary global scalar register file.

FIG. 3 illustrates global scalar register file 211. There are 16 independent 64-bit wide scalar registers designated A0 to A15. Each register of global scalar register file 211 can be read from or written to as 64-bits of scalar data. All scalar datapath side A 115 functional units (L1 unit 221, S1 unit 222, M1 unit 223, N1 unit 224, D1 unit 225 and D2 unit 226) can read or write to global scalar register file 211. Global scalar register file 211 may be read as 32-bits or as 64-bits and may only be written to as 64-bits. The instruction executing determines the read data size. Vector datapath side B 116 functional units (L2 unit 241, S2 unit 242, M2 unit 243, N2 unit 244, C unit 245 and P unit 246) can read from global scalar register file 211 via crosspath 117 under restrictions that will be detailed below.

Figure 4:
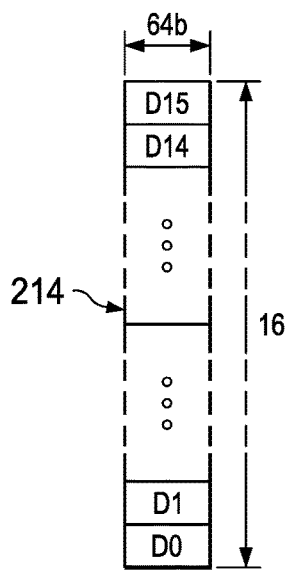
FIG. 4 shows an exemplary local scalar register file shared by arithmetic functional units.

FIG. 4 illustrates D1/D2 local register file 214. There are 16 independent 64-bit wide scalar registers designated D0 to D16. Each register of D1/D2 local register file 214 can be read from or written to as 64-bits of scalar data. All scalar datapath side A 115 functional units (L1 unit 221, S1 unit 222, M1 unit 223, N1 unit 224, D1 unit 225 and D2 unit 226) can write to global scalar register file 211. Only D1 unit 225 and D2 unit 226 can read from D1/D2 local scalar register file 214. It is expected that data stored in D1/D2 local scalar register file 214 will include base addresses and offset addresses used in address calculation.

Figure 5:
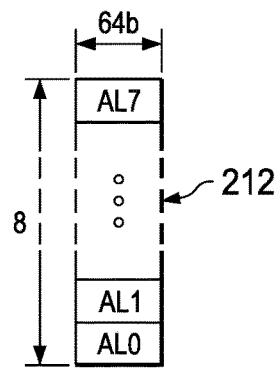
FIG. 5 shows an exemplary local scalar register file shared by multiply functional units.

FIG. 5 illustrates L1/S1 local register file 212. The example illustrated in FIG. 5 has 8 independent 64-bit wide scalar registers designated AL0 to AL7. The preferred instruction coding (see FIG. 15) permits L1/S1 local register file 212 to include up to 16 registers. The example of FIG. 5 implements only 8 registers to reduce circuit size and complexity. Each register of L1/S1 local register file 212 can be read from or written to as 64-bits of scalar data. All scalar datapath side A 115 functional units (L1 unit 221, S1 unit 222, M1 unit 223, N1 unit 224, D1 unit 225 and D2 unit 226) can write to L1/S1 local scalar register file 212. Only L1 unit 221 and S1 unit 222 can read from L1/S1 local scalar register file 212.

Figure 6:
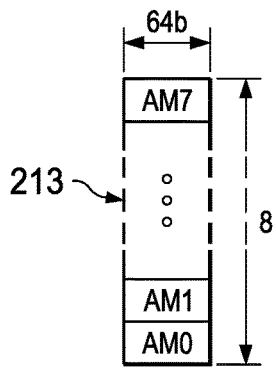
FIG. 6 shows an exemplary local scalar register file shared by load/store units.

FIG. 6 illustrates M1/N1 local register file 213. The example illustrated in FIG. 6 has 8 independent 64-bit wide scalar registers designated AM0 to AM7. The preferred instruction coding (see FIG. 15) permits M1/N1 local register file 213 to include up to 16 registers. The example of FIG. 6 implements only 8 registers to reduce circuit size and complexity. Each register of M1/N1 local register file 213 can be read from or written to as 64-bits of scalar data. All scalar datapath side A 115 functional units (L1 unit 221, S1 unit 222, M1 unit 223, N1 unit 224, D1 unit 225 and D2 unit 226) can write to M1/N1 local scalar register file 213. Only M1 unit 223 and N1 unit 224 can read from M1/N1 local scalar register file 213.

Figure 7:
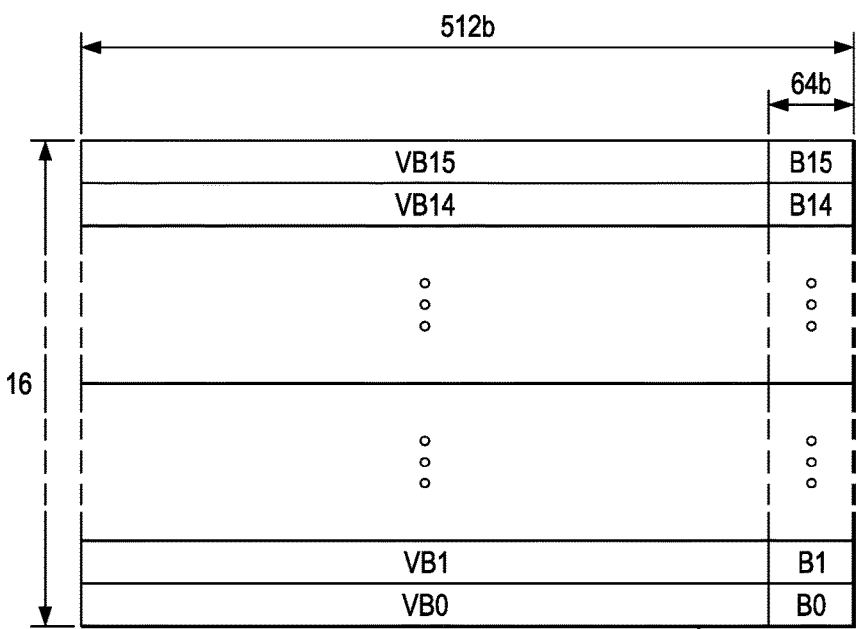
FIG. 7 shows an exemplary global vector register file.

FIG. 7 illustrates global vector register file 231. There are 16 independent 512-bit wide vector registers. Each register of global vector register file 231 can be read from or written to as 64-bits of scalar data designated B0 to B15. Each register of global vector register file 231 can be read from or written to as 512-bits of vector data designated VB0 to VB15. The instruction type determines the data size. All vector datapath side B 116 functional units (L2 unit 241, S2 unit 242, M2 unit 243, N2 unit 244, C unit 245 and P unit 246) can read or write to global scalar register file 231. Scalar datapath side A 115 functional units (L1 unit 221, S1 unit 222, M1 unit 223, N1 unit 224, D1 unit 225 and D2 unit 226) can read from global vector register file 231 via crosspath 117 under restrictions that will be detailed below.

Figure 8:
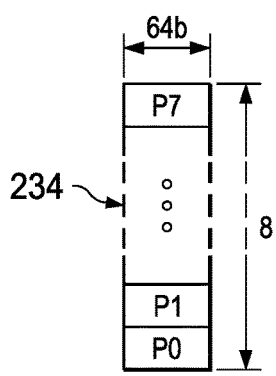
FIG. 8 shows an exemplary predicate register file.

FIG. 8 illustrates P local register file 234. There are 8 independent 64-bit wide registers designated P0 to P7. Each register of P local register file 234 can be read from or written to as 64-bits of scalar data. Vector datapath side B 116 functional units L2 unit 241, S2 unit 242, C unit 244 and P unit 246 can write to P local register file 234. Only L2 unit 241, S2 unit 242 and P unit 246 can read from P local scalar register file 234. A commonly expected use of P local register file 234 includes: writing one bit SIMD vector comparison results from L2 unit 241, S2 unit 242 or C unit 244; manipulation of the SIMD vector comparison results by P unit 246; and use of the manipulated results in control of a further SIMD vector operation.

Figure 9:
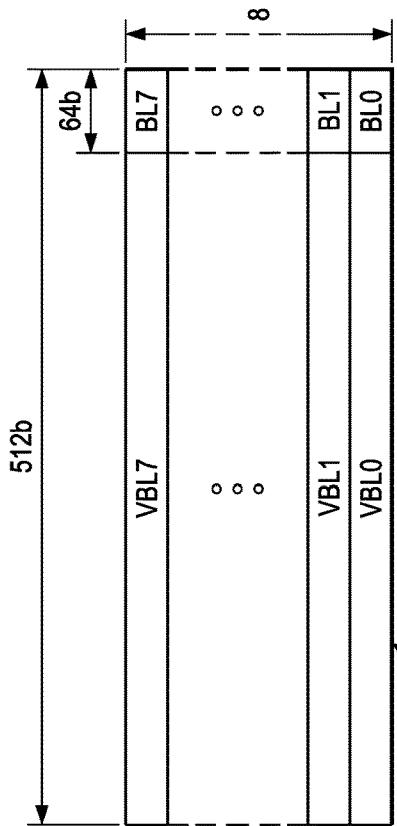
FIG. 9 shows an exemplary local vector register file shared by arithmetic functional units.

FIG. 9 illustrates L2/S2 local register file 232. The example illustrated in FIG. 9 has 8 independent 512-bit wide vector registers. The preferred instruction coding (see FIG. 15) permits L2/S2 local register file 232 to include up to 16 registers. The example of FIG. 9 implements only 8 registers to reduce circuit size and complexity. Each register of L2/S2 local vector register file 232 can be read from or written to as 64-bits of scalar data designated BL0 to BL7. Each register of L2/S2 local vector register file 232 can be read from or written to as 512-bits of vector data designated VBL0 to VBL7. The instruction type determines the data size. All vector datapath side B 116 functional units (L2 unit 241, S2 unit 242, M2 unit 243, N2 unit 244, C unit 245 and P unit 246) can write to L2/S2 local vector register file 232. Only L2 unit 241 and S2 unit 242 can read from L2/S2 local vector register file 232.

Figure 10:
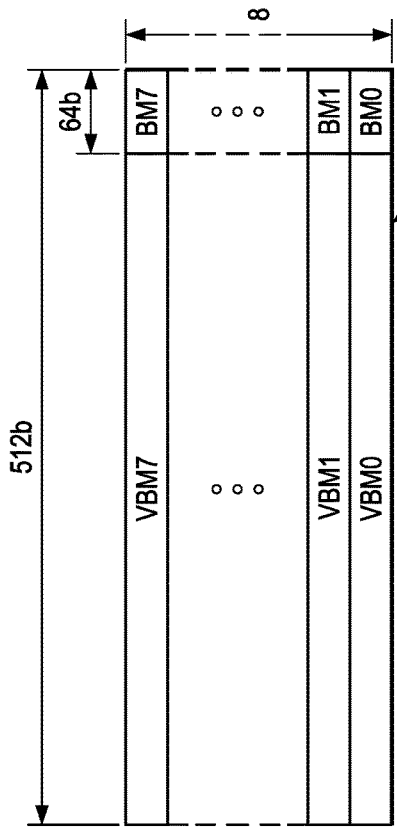
FIG. 10 shows an exemplary local vector register file shared by multiply and correlation functional units.

FIG. 10 illustrates M2/N2/C local register file 233. The example illustrated in FIG. 10 has 8 independent 512-bit wide vector registers. The preferred instruction coding (see FIG. 15) permits M2/N2/C local vector register file 233 include up to 16 registers. The example of FIG. 10 implements only 8 registers to reduce circuit size and complexity. Each register of M2/N2/C local vector register file 233 can be read from or written to as 64-bits of scalar data designated BM0 to BM7. Each register of M2/N2/C local vector register file 233 can be read from or written to as 512-bits of vector data designated VBM0 to VBM7. All vector datapath side B 116 functional units (L2 unit 241, S2 unit 242, M2 unit 243, N2 unit 244, C unit 245 and P unit 246) can write to M2/N2/C local vector register file 233. Only M2 unit 243, N2 unit 244 and C unit 245 can read from M2/N2/C local vector register file 233.

The provision of global register files accessible by all functional units of a side and local register files accessible by only some of the functional units of a side is a design choice. Some examples of this disclosure employ only one type of register file corresponding to the disclosed global register files.

Referring back to FIG. 2, crosspath 117 permits limited exchange of data between scalar datapath side A 115 and vector datapath side B 116. During each operational cycle one 64-bit data word can be recalled from global scalar register file A 211 for use as an operand by one or more functional units of vector datapath side B 116 and one 64-bit data word can be recalled from global vector register file 231 for use as an operand by one or more functional units of scalar datapath side A 115. Any scalar datapath side A 115 functional unit (L1 unit 221, S1 unit 222, M1 unit 223, N1 unit 224, D1 unit 225 and D2 unit 226) may read a 64-bit operand from global vector register file 231. This 64-bit operand is the least significant bits of the 512-bit data in the accessed register of global vector register file 231. Plural scalar datapath side A 115 functional units may employ the same 64-bit crosspath data as an operand during the same operational cycle. However, only one 64-bit operand is transferred from vector datapath side B 116 to scalar datapath side A 115 in any single operational cycle. Any vector datapath side B 116 functional unit (L2 unit 241, S2 unit 242, M2 unit 243, N2 unit 244, C unit 245 and P unit 246) may read a 64-bit operand from global scalar register file 211. If the corresponding instruction is a scalar instruction, the crosspath operand data is treated as any other 64-bit operand. If the corresponding instruction is a vector instruction, the upper 448 bits of the operand are zero filled. Plural vector datapath side B 116 functional units may employ the same 64-bit crosspath data as an operand during the same operational cycle. Only one 64-bit operand is transferred from scalar datapath side A 115 to vector datapath side B 116 in any single operational cycle.

Streaming engine 125 transfers data in certain restricted circumstances. Streaming engine 125 controls two data streams. A stream consists of a sequence of elements of a particular type. Programs that operate on streams read the data sequentially, operating on each element in turn. Every stream has the following basic properties. The stream data have a well-defined beginning and ending in time. The stream data have fixed element size and type throughout the stream. The stream data have a fixed sequence of elements. Thus, programs cannot seek randomly within the stream. The stream data is read-only while active. Programs cannot write to a stream while simultaneously reading from it. Once a stream is opened, the streaming engine 125: calculates the address; fetches the defined data type from level two unified cache (which may require cache service from a higher level memory); performs data type manipulation such as zero extension, sign extension, data element sorting/swapping such as matrix transposition; and delivers the data directly to the programmed data register file within CPU 110. Streaming engine 125 is thus useful for real-time digital filtering operations on well-behaved data. Streaming engine 125 frees these memory fetch tasks from the corresponding CPU enabling other processing functions.

Streaming engine 125 provides the following benefits. Streaming engine 125 permits multi-dimensional memory accesses. Streaming engine 125 increases the available bandwidth to the functional units. Streaming engine 125 minimizes the number of cache miss stalls since the stream buffer bypasses level one data cache 123. Streaming engine 125 reduces the number of scalar operations required to maintain a loop. Streaming engine 125 manages address pointers. Streaming engine 125 handles address generation automatically freeing up the address generation instruction slots and D1 unit 225 and D2 unit 226 for other computations.

CPU 110 operates on an instruction pipeline. Instructions are fetched in instruction packets of fixed length further described below. All instructions require the same number of pipeline phases for fetch and decode, but require a varying number of execute phases.

Figure 11:
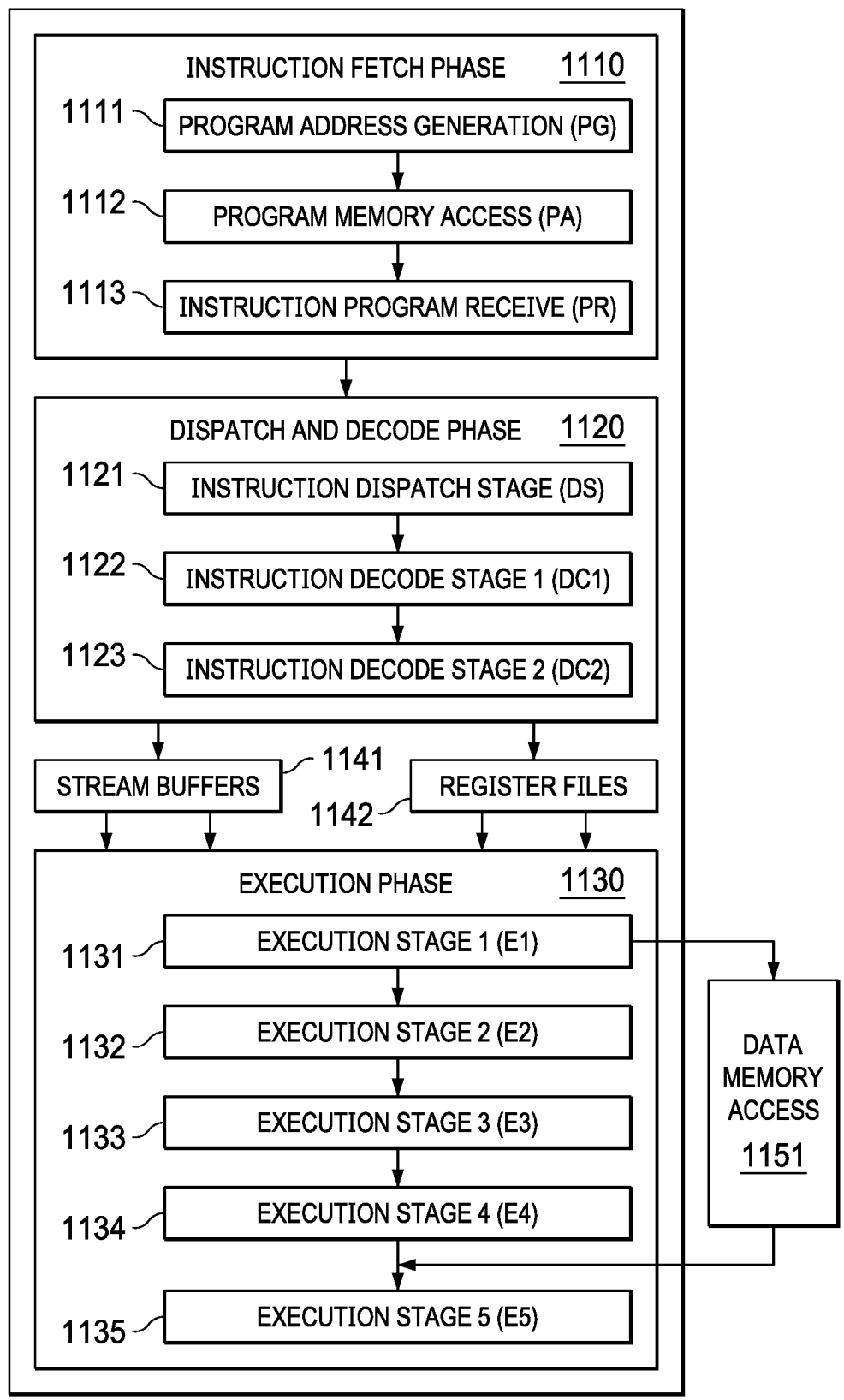
FIG. 11 shows pipeline phases of the central processing unit in accordance with various examples.

FIG. 11 illustrates the following pipeline phases: program fetch phase 1110, dispatch and decode phases 1120 and execution phases 1130. Program fetch phase 1110 includes three stages for all instructions. Dispatch and decode phases 1120 include three stages for all instructions. Execution phase 1130 includes one to four stages dependent on the instruction.

Fetch phase 1110 includes program address generation stage 1111 (PG), program access stage 1112 (PA) and program receive stage 1113 (PR). During program address generation stage 1111 (PG), the program address is generated in the CPU and the read request is sent to the memory controller for the level one instruction cache L1I. During the program access stage 1112 (PA) the level one instruction cache L1I processes the request, accesses the data in its memory and sends a fetch packet to the CPU boundary. During the program receive stage 1113 (PR) the CPU registers the fetch packet.

Figure 12:
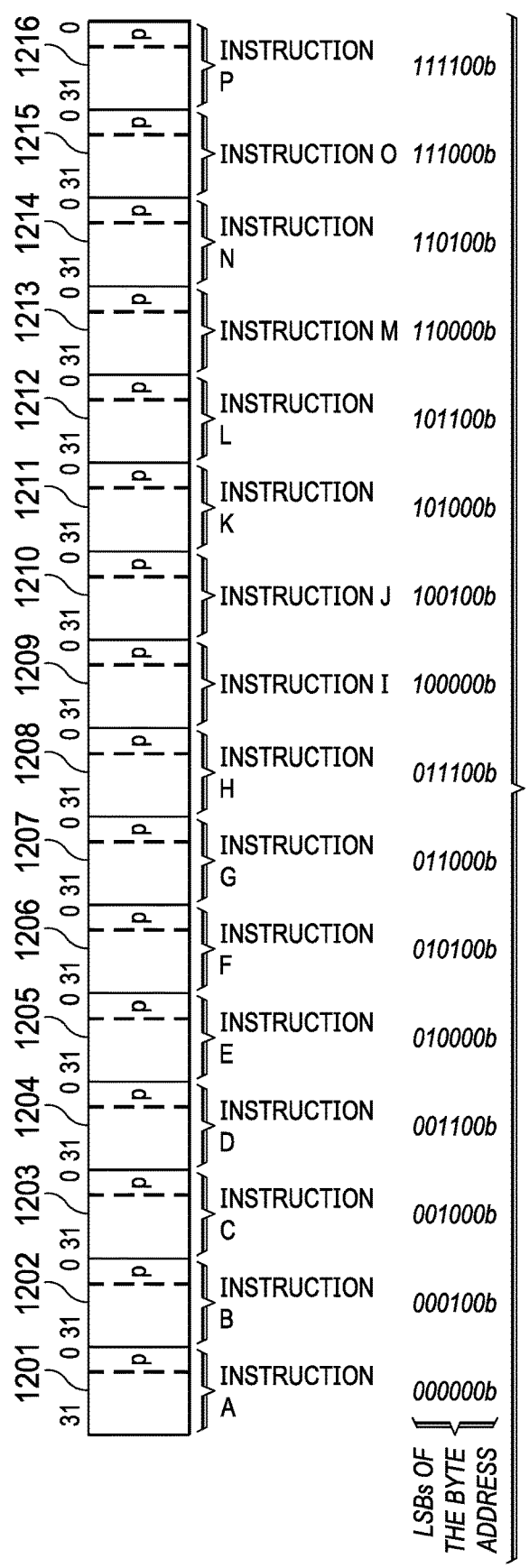
FIG. 12 shows sixteen instructions of a single fetch packet in accordance with various examples.

Instructions are always fetched sixteen 32-bit wide slots, constituting a fetch packet, at a time. FIG. 12 illustrates 16 instructions 1201 to 1216 of a single fetch packet. Fetch packets are aligned on 512-bit (16-word) boundaries. An example employs a fixed 32-bit instruction length. Fixed length instructions are advantageous for several reasons. Fixed length instructions enable easy decoder alignment. A properly aligned instruction fetch can load plural instructions into parallel instruction decoders. Such a properly aligned instruction fetch can be achieved by predetermined instruction alignment when stored in memory (fetch packets aligned on 512-bit boundaries) coupled with a fixed instruction packet fetch. An aligned instruction fetch permits operation of parallel decoders on instruction-sized fetched bits. Variable length instructions require an initial step of locating each instruction boundary before they can be decoded. A fixed length instruction set generally permits more regular layout of instruction fields. This simplifies the construction of each decoder which is an advantage for a wide issue VLIW central processor.

The execution of the individual instructions is partially controlled by a p bit in each instruction. This p bit is preferably bit 0 of the 32-bit wide slot. The p bit determines whether an instruction executes in parallel with a next instruction. Instructions are scanned from lower to higher address. If the p bit of an instruction is 1, then the next following instruction (higher memory address) is executed in parallel with (in the same cycle as) that instruction. If the p bit of an instruction is 0, then the next following instruction is executed in the cycle after the instruction.

CPU 110 and level one instruction cache L1I 121 pipelines are de-coupled from each other. Fetch packet returns from level one instruction cache L1I can take different number of clock cycles, depending on external circumstances such as whether there is a hit in level one instruction cache 121 or a hit in level two combined cache 130. Therefore program access stage 1112 (PA) can take several clock cycles instead of 1 clock cycle as in the other stages.

The instructions executing in parallel constitute an execute packet. In an example, an execute packet can contain up to sixteen instructions. No two instructions in an execute packet may use the same functional unit. A slot is one of five types: 1) a self-contained instruction executed on one of the functional units of CPU 110 (L1 unit 221, S1 unit 222, M1 unit 223, N1 unit 224, D1 unit 225, D2 unit 226, L2 unit 241, S2 unit 242, M2 unit 243, N2 unit 244, C unit 245 and P unit 246); 2) a unitless instruction such as a NOP (no operation) instruction or multiple NOP instruction; 3) a branch instruction; 4) a constant field extension; and 5) a conditional code extension. Some of these slot types will be further explained below.

Dispatch and decode phases 1120 include instruction dispatch to appropriate execution unit stage 1121 (DS), instruction pre-decode stage 1122 (DC1); and instruction decode, operand reads stage 1123 (DC2). During instruction dispatch to appropriate execution unit stage 1121 (DS), the fetch packets are split into execute packets and assigned to the appropriate functional units. During the instruction pre-decode stage 1122 (DC1), the source registers, destination registers and associated paths are decoded for the execution of the instructions in the functional units. During the instruction decode, operand reads stage 1123 (DC2), more detailed unit decodes are done, as well as reading operands from the register files.

Execution phases 1130 includes execution stages 1131 to 1135 (E1 to E5). Different types of instructions require different numbers of these stages to complete their execution. These stages of the pipeline play an important role in understanding the device state at CPU cycle boundaries.

During execute 1 stage 1131 (E1) the conditions for the instructions are evaluated and operands are operated on. As illustrated in FIG. 11, execute 1 stage 1131 may receive operands from a stream buffer 1141 and one of the register files shown schematically as 1142. For load and store instructions, address generation is performed and address modifications are written to a register file. For branch instructions, branch fetch packet in PG phase is affected. As illustrated in FIG. 11, load and store instructions access memory here shown schematically as memory 1151. For single-cycle instructions, results are written to a destination register file. This assumes that any conditions for the instructions are evaluated as true. If a condition is evaluated as false, the instruction does not write any results or have any pipeline operation after execute 1 stage 1131.

During execute 2 stage 1132 (E2) load instructions send the address to memory. Store instructions send the address and data to memory. Single-cycle instructions that saturate results set the SAT bit in the control status register (CSR) if saturation occurs. For 2-cycle instructions, results are written to a destination register file.

During execute 3 stage 1133 (E3) data memory accesses are performed. Any multiply instructions that saturate results set the SAT bit in the control status register (CSR) if saturation occurs. For 3-cycle instructions, results are written to a destination register file.

During execute 4 stage 1134 (E4) load instructions bring data to the CPU boundary. For 4-cycle instructions, results are written to a destination register file.

During execute 5 stage 1135 (E5) load instructions write data into a register. This is illustrated schematically in FIG. 11 with input from memory 1151 to execute 5 stage 1135.

In some cases, the processor 100 (e.g., a DSP) may be called upon to execute software that requires performance of common algorithms that require reversing the order of data elements for additional computation (e.g., operations to be performed on the data elements), such as autocorrelation. Reversing data elements in order to perform additional operations on the data elements may require multiple cycles to complete. Considering that DSPs may be frequently to perform algorithms that require such reversal of data elements, such computational overhead in the form of multiple cycles required to perform each reversal of data elements is not desirable.

Figure 13A:
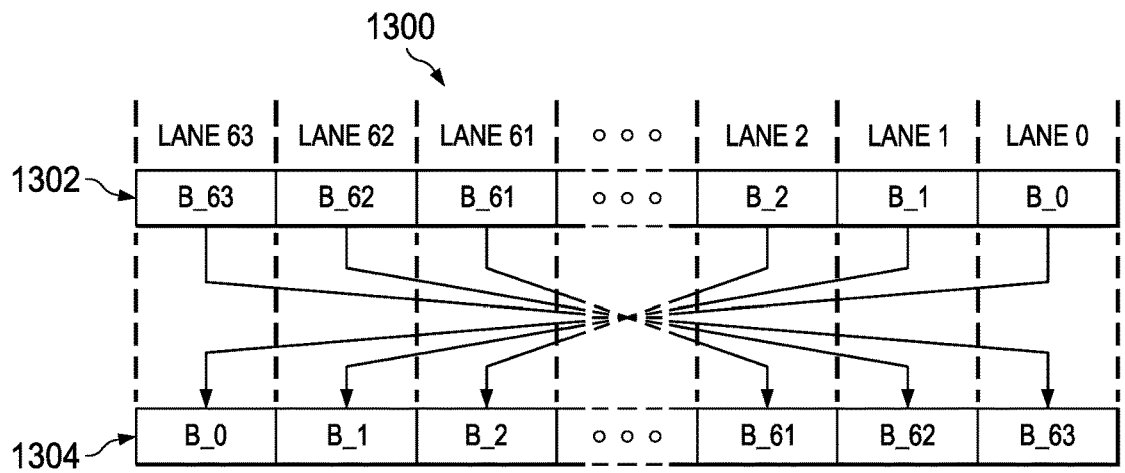
FIGS. 13a-13d show examples of a vector reverse operation for varying data element sizes in accordance with various examples.

FIGS. 13a-13d illustrate reversal of exemplary data elements. FIG. 13a illustrates an example of registers 1300 utilized in executing a vector reverse instruction in which data elements are each one byte (e.g., 8 bits). The registers 1300 include a source register 1302 and a destination register 1304. In this example, the source register 1302 and the destination register 1304 are 512-bit vector registers such as those contained in the global vector register file 231 explained above. However, in other examples, the source register 1302 and the destination register 1304 may be of different sizes; the scope of this disclosure is not limited to a particular register size or set of register sizes.

In this example, in which the data elements are each one byte, the source register 1302 and the destination register 1304 are divided into 64 equal-sized lanes labeled Lane 0 through Lane 63. Each lane of the source register 1302 contains a one-byte data element, labeled B_0 through B_63. In response to executing a vector reverse instruction, each lane of the destination register 1304 contains a data element from the source register 1302, but in a reversed order. For example, the data element B_0 in Lane 0 in the source register 1302 is placed in Lane 63 in the destination register 1304; while the data element B_1 in Lane 1 in the source register 1302 is placed in Lane 62 in the destination register 1304; and so on. While the order of the one-byte data elements is reversed in the destination register 1304, the ordering of the data (e.g., bits) within each data element remains in-order, preserving the value of each data element even when the order of data elements within the vector is reversed.

Figure 13B:
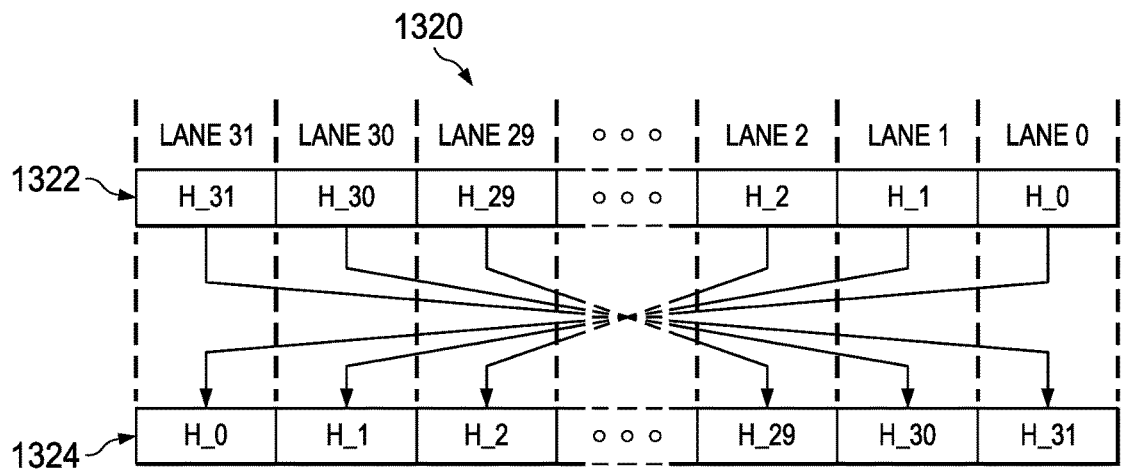

FIG. 13b illustrates an example of registers 1320 utilized in executing a vector reverse instruction in which data elements are each one half word (e.g., 16 bits). The registers 1320 include a source register 1322 and a destination register 1324. In this example, the source register 1322 and the destination register 1324 are 512-bit vector registers such as those contained in the global vector register file 231 explained above. However, in other examples, the source register 1322 and the destination register 1324 may be of different sizes; the scope of this disclosure is not limited to a particular register size or set of register sizes.

In this example, in which the data elements are each one half word, the source register 1322 and the destination register 1324 are divided into 32 equal-sized lanes labeled Lane 0 through Lane 31. Each lane of the source register 1322 contains a one-byte data element, labeled H_0 through H_31. In response to executing a vector reverse instruction, each lane of the destination register 1324 contains a data element from the source register 1322, but in a reversed order. For example, the data element H_0 in Lane 0 in the source register 1322 is placed in Lane 31 in the destination register 1324; while the data element H_1 in Lane 1 in the source register 1322 is placed in Lane 30 in the destination register 1324; and so on. While the order of the half word data elements is reversed in the destination register 1324, the ordering of the data (e.g., bits) within each data element remains in-order, preserving the value of each data element even when the order of data elements within the vector is reversed.

Figure 13C:
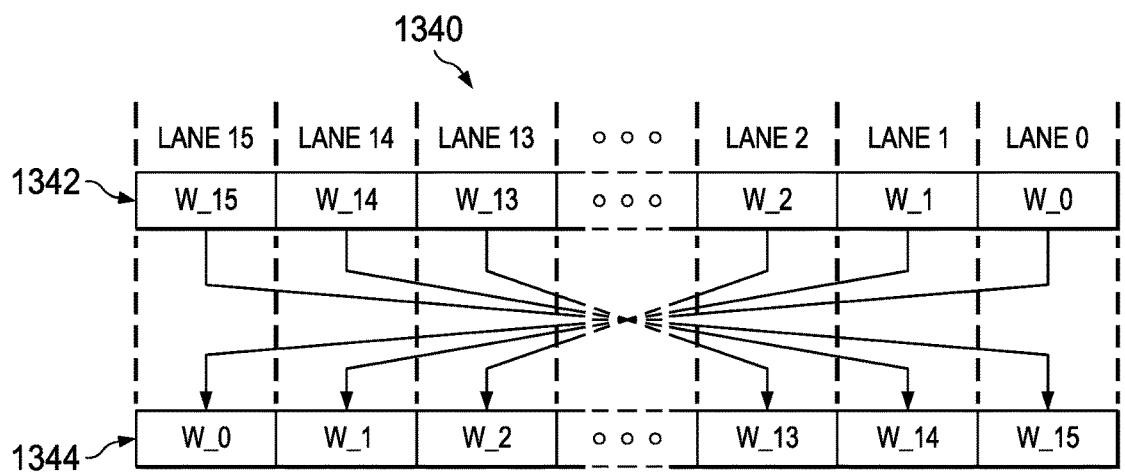

FIG. 13c illustrates an example of registers 1340 utilized in executing a vector reverse instruction in which data elements are each one word (e.g., 32 bits). The registers 1340 include a source register 1342 and a destination register 1344. In this example, the source register 1342 and the destination register 1344 are 512-bit vector registers such as those contained in the global vector register file 231 explained above. However, in other examples, the source register 1342 and the destination register 1344 may be of different sizes; the scope of this disclosure is not limited to a particular register size or set of register sizes.

In this example, in which the data elements are each one word, the source register 1342 and the destination register 1344 are divided into 16 equal-sized lanes labeled Lane 0 through Lane 15. Each lane of the source register 1342 contains a one-word data element, labeled W_0 through W_15. In response to executing a vector reverse instruction, each lane of the destination register 1344 contains a data element from the source register 1342, but in a reversed order. For example, the data element W_0 in Lane 0 in the source register 1342 is placed in Lane 15 in the destination register 1344; while the data element W_1 in Lane 1 in the source register 1342 is placed in Lane 14 in the destination register 1344; and so on. While the order of the one-word data elements is reversed in the destination register 1344, the ordering of the data (e.g., bits) within each data element remains in-order, preserving the value of each data element even when the order of data elements within the vector is reversed.

Figure 13D:
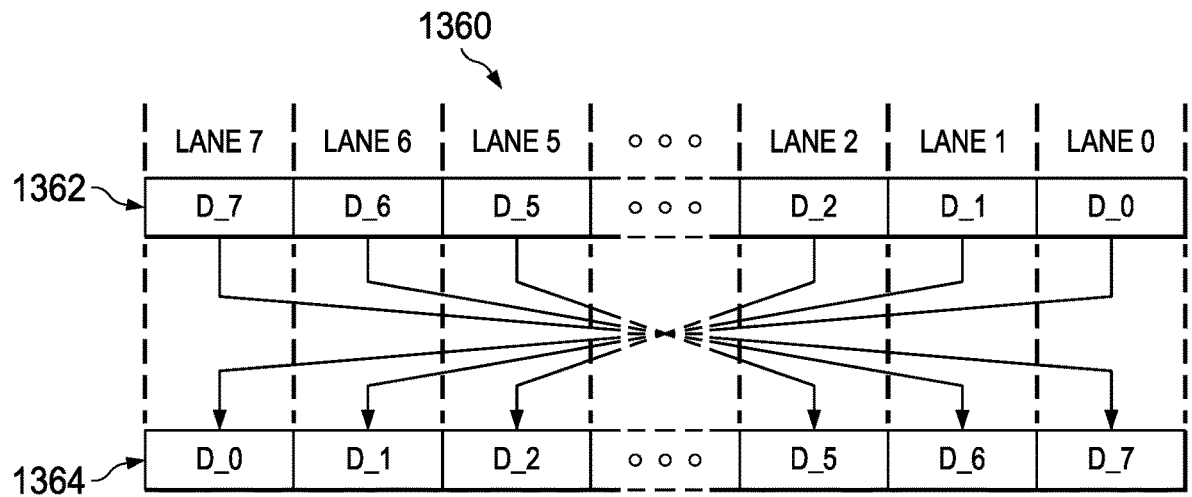

FIG. 13d illustrates an example of registers 1360 utilized in executing a vector reverse instruction in which data elements are each one double word (e.g., 64 bits). The registers 1360 include a source register 1362 and a destination register 1364. In this example, the source register 1362 and the destination register 1364 are 512-bit vector registers such as those contained in the global vector register file 231 explained above. However, in other examples, the source register 1362 and the destination register 1364 may be of different sizes; the scope of this disclosure is not limited to a particular register size or set of register sizes.

In this example, in which the data elements are each one double word, the source register 1362 and the destination register 1364 are divided into 8 equal-sized lanes labeled Lane 0 through Lane 7. Each lane of the source register 1362 contains a double word data element, labeled D_0 through D_7. In response to executing a vector reverse instruction, each lane of the destination register 1364 contains a data element from the source register 1362, but in a reversed order. For example, the data element D_0 in Lane 0 in the source register 1362 is placed in Lane 7 in the destination register 1364; while the data element D_1 in Lane 1 in the source register 1362 is placed in Lane 6 in the destination register 1364; and so on. While the order of the double word data elements is reversed in the destination register 1364, the ordering of the data (e.g., bits) within each data element remains in-order, preserving the value of each data element even when the order of data elements within the vector is reversed.

FIG. 14a illustrates an example of the instruction coding 1400 of functional unit instructions used by examples of this disclosure. Other instruction codings are feasible and within the scope of this disclosure. Each instruction consists of 32 bits and controls the operation of one of the individually controllable functional units (L1 unit 221, S1 unit 222, M1 unit 223, N1 unit 224, D1 unit 225, D2 unit 226, L2 unit 241, S2 unit 242, M2 unit 243, N2 unit 244, C unit 245 and P unit 246). The bit fields are defined as follows.

The dst field 1402 (bits 26 to 31) specifies a destination register in a corresponding vector register file 231 that contains the results (e.g., reversed source data) of execution of the vector reverse instruction. The result of executing of the vector reverse instruction is a 512-bit vector in one example.

In the exemplary instruction coding 1400, bits 20 through 25 contains a constant value that serves as a placeholder.

The src1 field 1404 (bits 14 to 19) specifies the source register, which includes data elements that are, in the example of FIG. 14a, one-byte data elements, the order of which is to be reversed according to the above description, creating reversed source data that are stored in the destination register.

The opcode field 1406 (bits 5 to 13) designates appropriate instruction options (e.g., whether lanes of the source data are one byte each, one half word each, one word each, or one double word each). For example, the opcode field 1406 of FIG. 14a corresponds to reversing one-byte data elements, for example as shown in FIG. 13a. FIG. 14b illustrates instruction coding 1420 that is identical to that shown in FIG. 14a, except that the instruction coding 1420 includes an opcode field 1426 that corresponds to reversing half word data elements, for example as shown in FIG. 13b. FIG. 14c illustrates instruction coding 1440 that is identical to that shown in FIG. 14a, except that the instruction coding 1440 includes an opcode field 1446 that corresponds to reversing one-word data elements, for example as shown in FIG. 13c. FIG. 14d illustrates instruction coding 1460 that is identical to that shown in FIG. 14a, except that the instruction coding 1460 includes an opcode field 1466 that corresponds to reversing double word data elements, for example as shown in FIG. 13d. The unit field 1408 (bits 2 to 4) provides an unambiguous designation of the functional unit used and operation performed, which in this case is the C unit 245. A detailed explanation of the opcode is generally beyond the scope of this disclosure except for the instruction options detailed above.

The s bit (bit 1) is also contained in the field 1408 as it is a constant in the example of a vector reverse instruction. For example, s=1 selects vector datapath side B 116 limiting the functional unit to L2 unit 241, S2 unit 242, M2 unit 243, N2 unit 244, P unit 246 and the corresponding register file illustrated in FIG. 2.

The p bit 1410 (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to twelve instructions. Each instruction in an execute packet must use a different functional unit.

Figure 15:
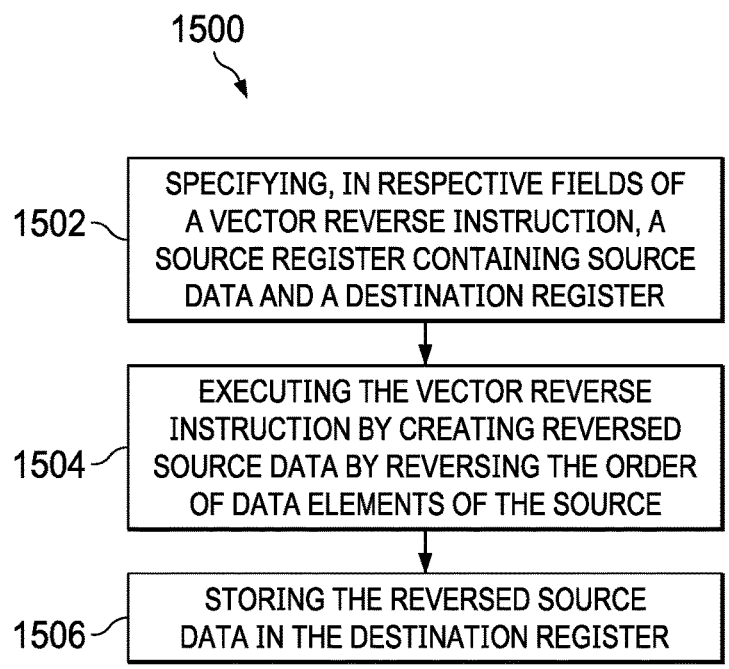
FIG. 15 shows a flow chart of a method of executing instructions in accordance with various examples.

FIG. 15 shows a flow chart of a method 1500 in accordance with examples of this disclosure. The method 1500 begins in block 1502 with specifying a source register containing source data and a destination register. The source register and destination register are specified in fields of a vector reverse instruction, such as the src1 field 1404 and the dst field 1402, respectively, which are described above with respect to FIGS. 14a-14d.

The method 1500 continues in block 1504 with executing the vector reverse instruction by creating reversed source data by reversing the order of data elements of the source data. In various examples, the source data comprises a 512-bit vector and is divided into lanes containing data elements of one byte (e.g., 8 bits), half word (e.g., 16 bits), word (e.g., 32 bits), or double word (e.g., 64 bits), for a total of 64, 32, 16, or 8 equal-sized lanes, respectively. In response to executing the vector reverse instruction, the reversed source data is created by reversing the order of the data elements stored in each lane regardless of the lane size.

In the example where the lane size is one byte (e.g., FIG. 13a, above), each lane of the source register contains a one-byte data element B_0 through B_63. In creating the reversed source data, the data element B_0 in Lane 0 in the source register is placed in Lane 63 in the destination register; while the data element B_1 in Lane 1 in the source register is placed in Lane 62 in the destination register; and so on. Regardless of the lane size, while the order of data elements is reversed in the destination register, the ordering of the data (e.g., bits) within each data element remains in-order, preserving the value of each data element even when the order of data elements within the vector is reversed.

The method 1500 concludes in block 1506 with storing the reversed source data in the destination register.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means +/−10 percent of the stated value.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A processor comprising:
an instruction fetch unit configured to receive a vector reverse instruction that specifies a single vector reverse operation; and
a datapath coupled to the instruction fetch unit that includes:
a register file that includes a source register including a set of n lanes configured to store a first vector that includes a set of n elements, in which a first element of the set of n elements is stored in a first lane of the set of n lanes and each succeeding element of the set of n elements is stored in a respective succeeding lane of the set of n lanes, and a destination register including a set of n lanes, wherein n is a positive integer of 4 or greater;
wherein the processor is configured to, based on the vector reverse instruction:
reverse an order of the set of n elements of the first vector to produce a second vector that includes the set of n elements; and
cause the second vector to be stored in the destination register, in which the first element of the set of n elements of the second vector is stored in the $n^{th}$ lane of the destination register and each succeeding element of the second vector is stored in a respective preceding lane of the destination register,
wherein the vector reverse instruction is executed in a single operation.

2. The processor of claim 1, wherein:
the instruction fetch unit is configured to receive a second instruction; and
the vector reverse instruction specifies whether the processor is permitted to execute the vector reverse instruction and the second instruction in parallel.

3. The processor of claim 1, wherein:
the datapath is a first datapath;
the processor further comprises a second datapath; and
the vector reverse instruction specifies the first datapath to perform the vector reverse instruction.

4. The processor of claim 1, wherein the vector reverse instruction specifies a size of each element of the set of elements.

5. The processor of claim 4, wherein the vector reverse instruction specifies the size of each element of the set of elements from among a byte, a half-word, a word, and a double word.

6. The processor of claim 1, wherein the vector reverse instruction specifies the source register and the destination register within the register file.

7. The processor of claim 1, further comprising a set of functional units, including a first functional unit, coupled to the register file, and an instruction decoder coupled between the instruction fetch unit and the datapath and configured to cause the first functional unit to receive the first vector, reverse the order of the set of elements to produce the second vector, and store the second vector.

8. The processor of claim 1, further comprising:
a processor core that includes the instruction fetch unit and the datapath;
a level one cache coupled to the processor core;
a level two cache coupled to the level one cache; and
a streaming engine coupled between the level two cache and the processor core in parallel with the level one cache, wherein the streaming engine is configured to retrieve the first vector from the level two cache and provide the first vector to the processor core for storing in the source register.

9. A processor comprising:
an instruction fetch unit configured to receive a vector reverse instruction and a second instruction, wherein the vector reverse instruction specifies whether the processor is to perform the vector reverse instruction and the second instruction in parallel and further specifies that the vector reverse instruction is a single vector reverse operation; and
a register file that includes a source register including a set of n lanes configured to store a first vector that includes a set of n elements, in which a first element of the set of n elements is stored in a first lane of the set of n lanes and each succeeding element of the set of n elements is stored in a respective succeeding lane of the set of n lanes, and a destination register including a set of n lanes, wherein n is a positive integer of 4 or greater;
a functional unit coupled to the register file and configured to, based on the vector reverse instruction:
receive the first vector from the source register;
reverse an order of the set of n elements of the first vector to produce a second vector that includes the set of n elements; and
cause the second vector to be stored in the destination register, in which the first element of the set of n elements of the second vector is stored in the $n^{th}$ lane of the destination register and each succeeding element of the second vector is stored in a respective preceding lane of the destination register,
wherein the vector reverse instruction is completed in a single operation.

10. The processor of claim 9, further comprising a set of functional units coupled to the register file that includes the functional unit, wherein the vector reverse instruction specifies the functional unit from among the set of functional units.

11. The processor of claim 9, further comprising:
a first datapath that includes the register file and the functional unit; and
a second datapath, wherein the vector reverse instruction specifies the first datapath.

12. The processor of claim 9, wherein the vector reverse instruction specifies a size of each element of the set of elements.

13. The processor of claim 12, wherein the vector reverse instruction specifies the size of each element of the set of elements from among a byte, a half-word, a word, and a double word.

14. The processor of claim 9, wherein the vector reverse instruction specifies the source register and the destination register within the register file.

15. The processor of claim 9, further comprising:
a processor core that includes the instruction fetch unit, the register file, and the functional unit;
a level one cache coupled to the processor core;
a level two cache coupled to the level one cache; and
a streaming engine coupled between the level two cache and the processor core in parallel with the level one cache, wherein the streaming engine is configured to retrieve the first vector from the level two cache and provide the first vector to the processor core for storing in the source register.

16. A method comprising:
receiving a vector reverse instruction that specifies a source register from a register file, and a destination register from the register file, wherein the vector reverse instruction further specifies that the vector reverse instruction is single vector reverse operation, wherein each of the source register and the destination register includes a set of n lanes, wherein n is a positive integer of 4 or greater; and
based on the vector reverse instruction:
receiving a first vector from the source register, wherein the first vector includes a set of n elements, in which a first element of the set of n elements is stored in a first lane of the set of n lanes of the source register and each succeeding element of the set of n elements is stored in a respective succeeding lane of the set of n lanes of the source register;
reversing the set of n elements of the first vector to produce a second vector that includes the set of n elements; and
storing the second vector in the destination register, in which the first element of the set of n elements of the second vector is stored in the $n^{th}$ lane of the destination register and each succeeding element of the second vector is stored in a respective preceding lane of the destination register,
wherein the vector reverse instruction is completed in a single operation.

17. The method of claim 16, further comprising:
receiving a second instruction, wherein the vector reverse instruction specifies whether to perform the vector reverse instruction and the second instruction in parallel; and
determining whether to perform the vector reverse instruction and the second instruction in parallel based on the vector reverse instruction.

18. The method of claim 16, wherein the vector reverse instruction specifies a datapath that includes a functional unit.

19. The method of claim 18, wherein the datapath further includes the register file.

20. The method of claim 16, wherein the vector reverse instruction specifies a size of each element of the set of elements.

* * * * *